United States Patent [19]
Mohsakowski et al.
[11] Patent Number: 4,933,819
[45] Date of Patent: Jun. 12, 1990

[54] APPARATUS FOR MOUNTING A BULB IN A REFLECTOR OPENING OF A HEADLIGHT

[75] Inventors: Klaus Mohsakowski, Lippstadt; Reinhold Brummel, Anröchte, both of Fed. Rep. of Germany

[73] Assignee: Hella KG Hueck & Co., Lippstadt, Fed. Rep. of Germany

[21] Appl. No.: 407,324

[22] Filed: Sep. 14, 1989

[30] Foreign Application Priority Data

Sep. 15, 1988 [DE] Fed. Rep. of Germany ....... 3831372
Sep. 15, 1988 [DE] Fed. Rep. of Germany ....... 3831371

[51] Int. Cl.[5] .............................................. B60Q 1/02
[52] U.S. Cl. ...................................... 362/61; 362/226; 362/457; 439/232; 439/518
[58] Field of Search .................. 362/61, 80, 226, 310, 362/382, 436, 437, 438, 440, 457, 458; 439/232, 226, 518, 527

[56] References Cited

U.S. PATENT DOCUMENTS 4,670,822 6/1987 Baker .................................... 362/61
4,811,178 3/1989 Ernst et al. ........................... 362/61
4,872,096 10/1989 Montet ................................ 362/226

FOREIGN PATENT DOCUMENTS 1902362 1/1968 Fed. Rep. of Germany ...... 362/457
3606538 4/1987 Fed. Rep. of Germany .
3729984 2/1989 Fed. Rep. of Germany ........ 362/80
2555824 5/1985 France ............................... 362/457

*Primary Examiner*—Ira S. Lazarus
*Assistant Examiner*—Sue Hagarman
*Attorney, Agent, or Firm*—Griffin, Branigan & Butler

[57] ABSTRACT

An apparatus for mounting a bulb in a reflector opening of a headlight includes tongues which are cut-out and bent-out of a portion of the reflector from which an opening is formed through which a bulb to be mounted thereat is inserted. These tongues engage notches in an edge of a base flange of the bulb in a radial direction to prevent rotation thereof. A holding spring which spans over the flange of the bulb base lies under tension against the flange and urges it against an opening frame of the reflector. The holding spring is attached to the reflector at cut outs in edges of the mounting tongues on opposite sides of the opening. Spring tongues from a middle portion of the holding spring impinge on the bulb base flange.

13 Claims, 3 Drawing Sheets

APPARATUS FOR MOUNTING A BULB IN A REFLECTOR OPENING OF A HEADLIGHT

This invention relates broadly to vehicle headlights, and more particularly, to an apparatus for mounting bulbs in vehicle headlights.

An apparatus for mounting a bulb in a reflector opening of a vehicle headlight is described in West German Patent Publication DE-PS No. 36 06 538. In the device of this publication, a holding spring is constructed of sheet metal and is attached at mounting openings on opposite sides of a bulb opening of the reflector by means of a self-latching construction. In this regard, the holding spring is pivotally attached in one mounting opening and is releasably attached at another opening. Because of these mounting openings, not only is the reflection surface of the reflector somewhat reduced, but also parts of the holding spring which are mounted in the interior of the reflector can create undesirable blinding beams for oncoming traffic. Also, when one changes a bulb, that is, when one takes the holding spring out of one of the mounting openings, and rotates it in the other mounting opening, he can damage a corrosion resistant lacquer and the reflection surface itself. Further, a distance between the attachment areas of the holding spring must be relatively great so that the holding spring must be quite stiff in order to press a base flange of the bulb with sufficient pressure against a bulb opening frame.

Thus, it is an object of this invention to provide an apparatus for mounting a bulb in a reflector bulb opening of a headlight in which affixing areas of a holding spring lie away from of a reflection surface and are quite close to one another. Further, it is an object of this invention to provide such affixing areas for a holding spring which allow the holding spring to be removed without detrimentally affecting the reflector surface or a corrosion resistant lacquer placed thereon.

With the headlight of West German Patent Publication DE PS No. 36 06 538, for example, a secure mount for a bulb in a reflector is not guaranteed when an axial force from the rear is applied to the holding spring thereof, which happens when electrical leads are positioned in an uncontrollable manner in a headlight housing and/or when a relatively stiff cable is attached to a free end portion of the holding spring thereby causing the holding spring to be sprung out of its engagement. It is also not certain that such a holding spring will hold its position under severe sideward force, tension, or forces from behind the holding spring. In any event, with the characteristics of that holding spring, it is possible that a bulb, with its base, can be mounted in a canted position and held by a holding spring in this position. This is because of the length of the spring, its bent shape, and its relatively small rigidity.

It is therefore an object of this invention to provide an apparatus for mounting a bulb in a reflector opening of a headlight with which it is virtually impossible to improperly mount a bulb in a canted attitude. In addition, it is an object of this invention to provide an apparatus for mounting a bulb in a reflector opening of a headlight with which the possibility for detachment of a holding spring are insignificant even when forces are applied thereto from behind or from the side. Similarly, it is an object of this invention to provide apparatus in which the holding spring can be easily freed from its attachment in a useful, friendly and uncomplicated manner when desired.

SUMMARY OF THE INVENTION

According to principles of this invention, an apparatus for mounting a bulb in a bulb opening of a vehicle headlight reflector includes mounting tongues cut and bent out of an opening frame defining the bulb opening on which a holding spring is mounted for spanning over a bulb base and contacting its radial flange for urging the radial flange against the opening frame. In this invention, the mounting tongues have cutout voids at side edges thereof for receiving the holding spring, one mounting tongue forming a pivotal coupling with the holding spring and the other mounting tongue forming a latching coupling with the holding spring The mounting tongue for the pivotal coupling is T-shaped while a leg of the spring coupled thereto is U-shaped with legs of the U being rolled to form eyelets for loosely receiving free ends of a cross-beam of the T-shape. The latch coupling is formed by a hook shaped mounting tongue and a cutout tab on the spring. The opening frame is produced by drawing a floor of a pot-shaped depression into the interior of the reflector.

The holding spring has a W-shape with free side legs thereof being coupled to the mounting tongues An inverted U-shaped middle portion of the W-shape spans over a middle contact of the bulb without touching it but spring tongues are cut out of transition areas of the in U-shape middle portion for impinging on the flange of the bulb base for urging it against the opening frame.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

A reflector 1 has a bulb opening 2 positioned approximately at an apex of the reflector 1 for receiving a bulb 3 which is held thereat by mounting apparatus. The bulb opening 2 is defined in a floor 4 which is part of a depression formed by a metal drawing process, the depression, including the floor 4, if formed of walls of the reflector 1 drawn into the interior of the reflector 1.

Figure 2:
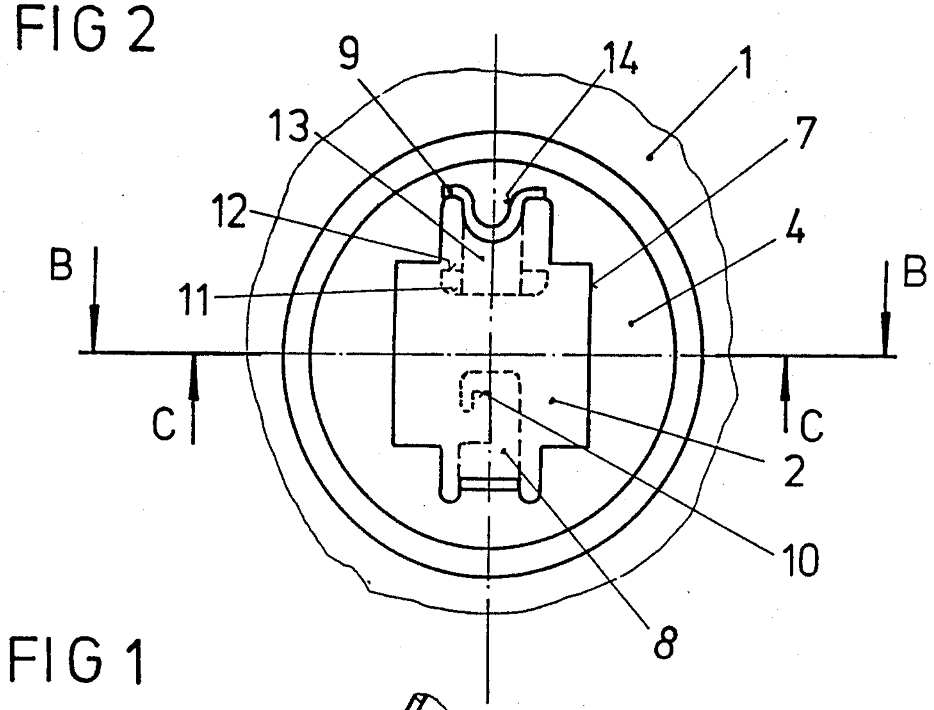
FIG. 2 is a view taken in the direction X in FIG. 1, but without the bulb and without a holding spring.
Figure 1:
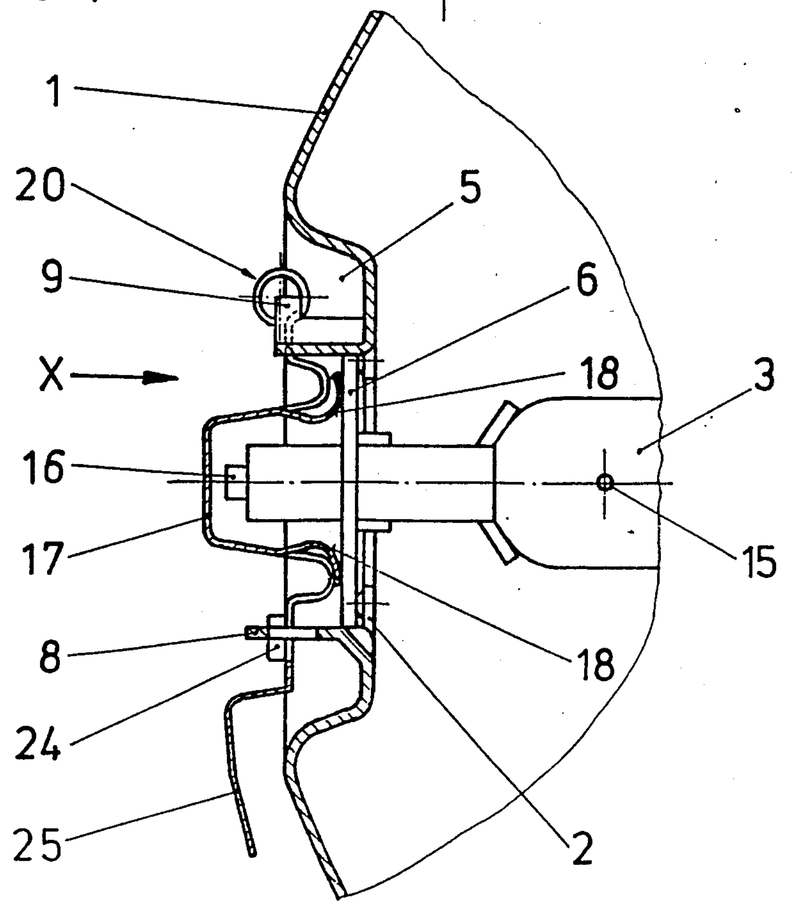
FIG. 1 is a segmented middle cross sectional view of a portion of a vehicle headlight for receiving a bulb, including the bulb and the apparatus for mounting the bulb.
Figure 4:
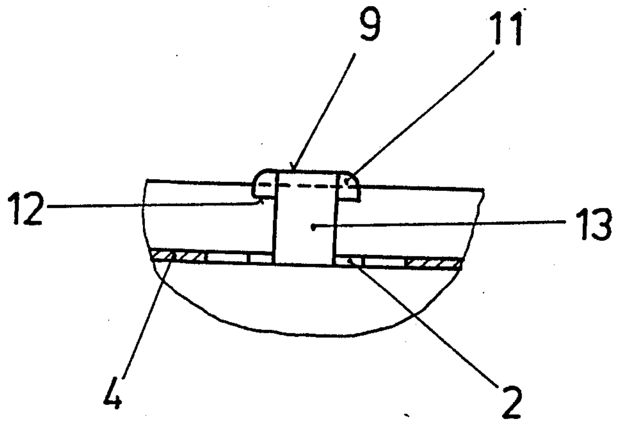
FIG. 4 is a cross-sectional view taken on line C—C in FIG. 2 showing an attachment area of the reflector at which the holding spring is pivotally attached.
Figure 3:
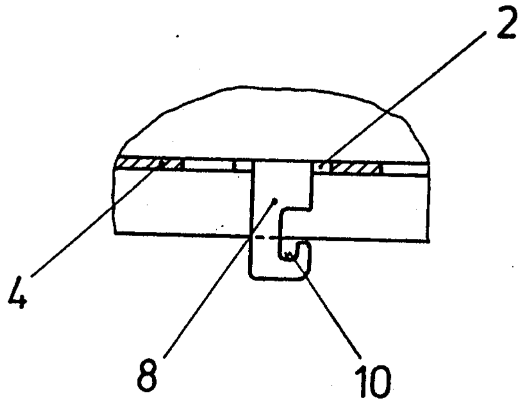
FIG. 3 is a segmented cross-sectional view taken on line B—B in FIG. 2 of an attaching area of the reflector at which the holding spring is latchably attached.
Figure 5:
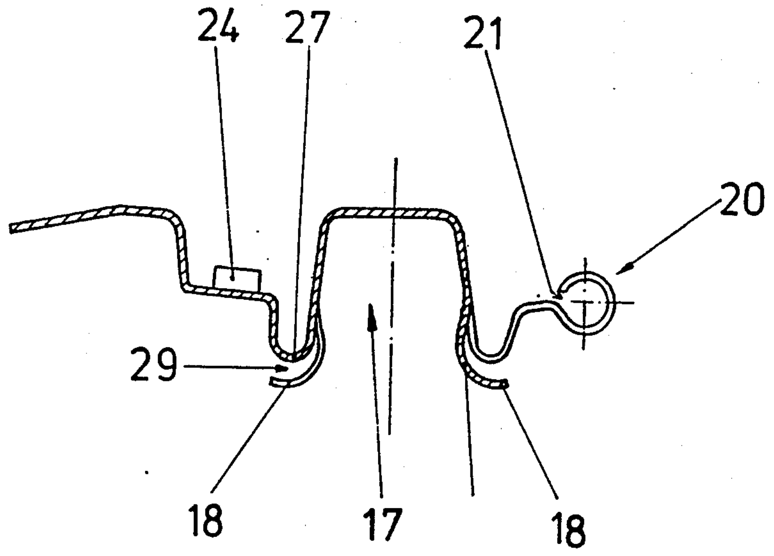
FIG. 5 is a cross-sectional view taken on line A—A in FIG. 6 of a holding spring.
Figure 6:
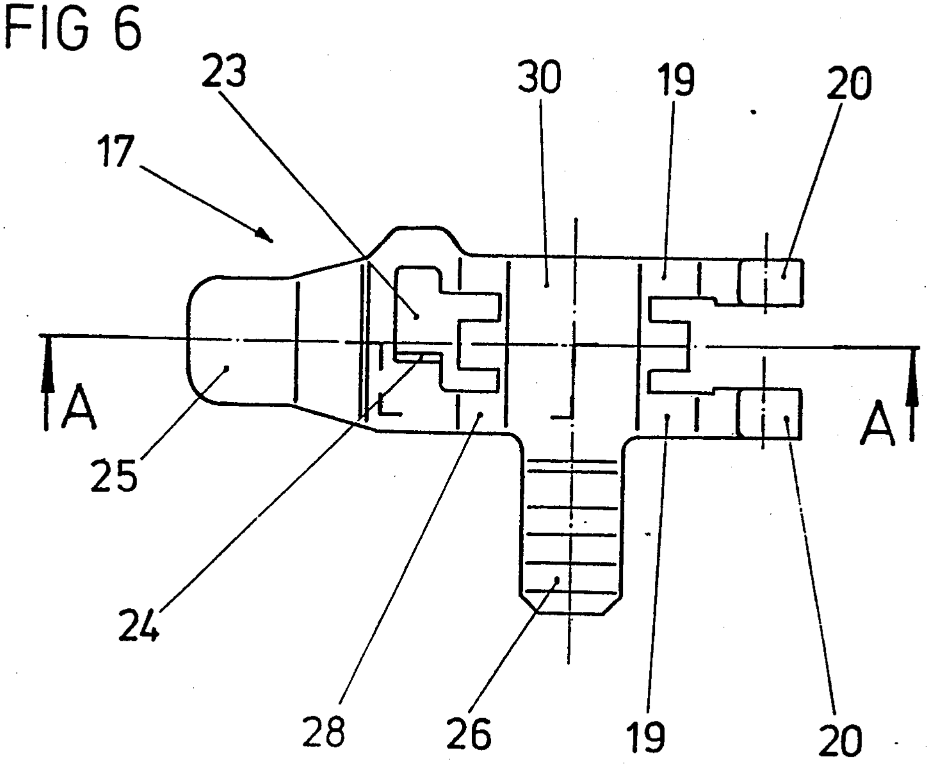
FIG. 6 is a plan view of a holding spring used in the apparatus of FIGS. 1–3.

The bulb 3, which is set from a rear side of the reflector 1, lies with a radially outwardly extending flange 6 on a flange receiving surface of a bulb opening frame 7. Two mounting tongues 8 and 9, which were originally directed toward one another as is shown in dashed lines in FIG. 2, are cut out of, and bent out of, a portion of material forming the reflector positioned at the rectangular bulb opening 2. The tongue 8 has a cutout void 10 in a side edge thereof to produce a hook shaped tongue 8 while the mounting tongue 9 is cut out at its side edges to form a T-shape. A cross beam 11 of the T-shape is positioned at the free end of the T-shape mounting tongue 9 with cut outs 12 being under ends of the cross beam. Both the hook-shaped mounting tongue 8 and the T-shape mounting tongue 9 are bent toward the rear side of the reflector 1 so as to be square to the floor 4. However, a standing beam 13 of the T-shaped mounting tongue 9 is bowed along its length axis before being bent to be square to the floor 4, with the bow extending toward the interior of the reflector. The convex side of this bow 14 engages in a correspondingly sized, semicircularly shaped recess on the edge of the bulb base flange 6, while the hook-shaped mounting tongue 8 fits in a rectangular notch in the flange 6 of the bulb base. The bulb mounting portion of the reflector 1 is drawn into the interior of the reflector so far that the filament 15 of the bulb 3 is positioned at a focus point of the reflector 1.

A holding spring 17 which is attached to the hook-shaped and T-shaped mounting tongues 8 and 9 is constructed of sheet metal and, with an U-shaped middle portion thereof, spans over a middle contact 16 of the bulb 3 without touching it. A spring tongue 18 is cut out of each leg of the U-shaped middle portion of the holding spring 17 and the ends of each the spring tongues 18 are biased against the bulb base flange 6. In this regard, a small gap 29 is left between bowed formed transition areas 27 of the inverted U-shaped middle portion and the bulb base flange 6. A free leg of the W-shaped holding spring 17 is cut to be U-shaped so as to provide legs 19 parallel to a length axis of the holding spring 17. Free outer ends 20 of the legs 19 are rolled to form eyelets; however, a small open gap 21 is left in the eyelets which is slightly smaller than the material thickness of the T-shaped tongue 9. Ends of the cross beam 11 of the T-shaped mounting tongue 9 is loosely mounted in these rolled eyelets, leaving space between eyelets 20 and the end portions of the cross beam 11 so that the holding spring 17 is pivotal, or rotatable, about an axis of elongation of the cross beam 11. The holding spring 17 is latched into the cutout void 10 of the hook shaped mounting tongue 8 with an edge of a catch opening 23 of a free leg 28 of the holding spring 17. The edge of the holding spring 17 defining the catch opening 23 which is hooked into the hook-shaped mounting tongue 8 includes a tab 24 cut therefrom and being bent out of the plane of the holding spring 17 opposite a closing direction of the holding spring 17 so that it can be placed under tension in the cutout void 10 of the hook shaped mounting tongue 8 A free end portion 25 of the holding spring 17, which is adjacent the catch opening 23, serves as a handle for manipulating the holding spring 17. A planar flat cross piece 30 which interconnects legs of the U-shaped middle portion of the holding spring 17 and which spands over the middle contact 16 of the bulb has a flat protrusion 26 which can be used as an electrical plug.

It will be appreciated by those of ordinary skill in the art, that the holding spring 17 is attachable to the tongues and that the tongues have cut out side edges for aiding them in engaging to the holding spring 17. With such an arrangement, the size of a bulb-opening frame of a reflector for receiving a bulb base flange must not be unduly small so that the danger does not exist that a bulb will fall through the bulb opening when it is being mounted.

Also, it is advantageous, that the holding spring is pivotal about one tongue and is releaseably latchable with the other. With this arrangement, a bulb can be easily and quickly changed. In this regard, it is also beneficial when the mounting tongue for the releasable latchable connection to the holding spring is cut out to be hook shaped. In this manner, after the holding spring is pivoted into the void of the hook shaped tongue it is securely latched to the reflector. It is further beneficial that the mounting tongue for providing the pivotal coupling is T-shaped with the cross beam thereof forming a tip of the tongue and wherein an end portion of a sheet metal strip forming the holding spring is blanked out to have an U-shape whose legs can be rolled perpendicular to their length axis to form eyelets for loosely receiving the cross beam of the T-shaped mounting tongue. Such a solution is not only uncomplicated and quite cost effective, but also the holding spring is securely fastened to provide pivoting.

Further, it is also beneficial to have the legs of the U-shaped blank out of the holding spring rolled into eyelets so that a gap is left that is slightly narrower than the material thickness of the T-shaped mounting tongue. In this respect, it is important that these legs can be easily flexed open to increase this gap sufficiently for mounting the cross beam of the T-shaped mounting tongue through the gap into the eyelets. After the eyelets are pressed together, the holding spring is reliably affixed to the reflector so that it cannot become detached therefrom. It is also an advantage to have a catch opening cut out of a free end of the holding spring which is releasably latchable with the hook-shaped mounting tongue. In such an arrangement, it is useful to have a tab bent out of an edge forming the catch opening opposite a closing direction of the holding spring so that it can be placed in the cutout void of the hook-shaped mounting tongue under tension. This arrangement guarantees that, once latched, the holding spring cannot be loosened merely by pressing the holding spring down but rather one must apply a sideward force component as well.

In a particularly beneficial embodiment of the invention, the bulb opening frame of the reflector is formed by drawing a floor into the interior of the reflector, thereby forming a pot shaped depression in the reflector. In this manner, the glow filaments of the bulbs can be placed at focus points of reflectors of every size while still using mounting tongues which can be produced as one piece with the reflectors which hold bulbs against radial and turning movement and also which serve as attachment elements for holding springs.

It is particularly beneficial that in this invention an inverted U-formed middle portion of the holding spring has spring tongues cut out of each leg thereof whose free ends press against the bulb face flange with a small gap left between bow shaped transition areas of the inverted U-shaped middle portion and the bulb face flange when the bulb is mounted in the headlight. If a force should be applied to the holding spring from the rear, the holding spring can flex until the gap is reduced to zero and at which point a strong opposite force comes into play because of the great ridigity of the holding spring. At the same time, this condition prevents an undue flexing of the free-cut spring tongues. Also, when the bow shaped transition areas impinge on the bulb base flange they stay there and the holding spring, because of its bias, remains engaged. The great rigidity of the holding spring also prevents the holding spring from being closed when a bulb is mounted in a canted configuration because the elasticity over the length of the spring will not readily allow this.

It is also beneficial that a connecting cross piece at the inverted U-shaped middle portion for coupling the two middle legs of the W-shaped holding spring is flat and also includes a flat electrical plug protruding parallel to a pivoting axis therefrom. This allows a grounding plug to be built right into the body of the holding spring in a cost effective manner and virtually guarantees that the holding spring will not be pulled out of its engagement by a pulling or pushing force.

The embodiments of the invention in which an exclusive property or privilege are claimed are defined as follows:

1. An apparatus for mounting a bulb in an opening of a vehicle headlight reflector of the type in which:

a radially outwardly directed flange of a bulb base lies on a planar surface of a frame of the opening with the bulb being locked in the radial direction and against turning by tongues cut out of the frame of the opening bent toward a rear side of the reflector which are in a notch of the bulb-base flange and in which a holding spring is biased against the base flange of the bulb and presses it against the opening frame, the holding spring being attached to the reflector on opposite sides of the opening;

the improvement wherein the holding spring is attached to the tongues and the tongues have cutout voids in side edges thereof for receiving the holding spring and attaching it to the reflector.

2. An apparatus for mounting a bulb as in claim 1 wherein the holding spring has a pivotal attachment with one tongue and a removably latchable attachment with the other tongue.

3. An apparatus for mounting a bulb as in claim 2 wherein a cutout void in the respective tongue to which the holding spring can be removably latchably attached allows the holding spring to be inserted therein only when the holding spring is flexed.

4. An apparatus for mounting a bulb as in claim 3 wherein the cutout void of the tongue for the removably latchable attachment produces a free end of the tongue which is cut in the shape of a hook.

5. An apparatus as in claim 2 wherein the tongue having a pivotal attachment with the holding spring is cut to be T-shaped, with a cross beam of the T forming an end portion of the tongue.

6. An apparatus as in claim 5 wherein the holding spring is constructed of an elongate sheet metal strip having a pivotal end which is blanked out to have a U-shape, with legs of the U-shape being rolled perpendicular to a length axis of the strip, to form eyelets for loosely receiving free ends of the cross beam of the T-shape.

7. An apparatus as in claim 6 wherein the legs of the U-shaped portion of the holding spring are rolled to a point at which they form an incomplete loop with a gap which is narrower than material thickness of the T-shaped tongue.

8. An apparatus for mounting a bulb as in claim 1 wherein a free end portion of the holding spring which is releasably latched to one tongue defines an engaging opening for engagement with the one tongue and wherein the one tongue is hook shaped.

9. An apparatus for mounting a bulb as in claim 8 wherein a tab which is cut out of an edge defining the engaging opening is bent opposite to a closing direction of the holding spring and lies under tension in a cutout void of the hook shaped tongue.

10. An apparatus as in claim 1 wherein a pot shaped depression toward the interior of the reflector is produced at an edge of the reflector forming the opening by drawing a floor of the depression toward the interior of the reflector.

11. An apparatus for mounting a bulb in an opening of a vehicle headlight reflector of the type in which:

a radially outwardly directed flange of a bulb base lies on a planar surface of a frame of the opening and a holding spring is biased against the base flange to press it against the opening frame, the holding spring being attached to the reflector on opposite sides of the opening;

the improvement wherein the holding spring has a W-shape with free side legs being coupled to an edge of the reflector forming the opening, wherein one, a hinged free side leg, is hingedly coupled thereto and the other, a latched free side leg, has a latch coupling thereto, and wherein an inverted U-shaped middle portion of the W-shape spans over a middle contact of the bulb without touching it;

and further wherein a spring tongue is cut out of each respective ones of two legs forming the inverted U-shaped middle portion of the W-shape, said spring tongues having free ends which are urged under tension against the base flange of the bulb, leaving a small gap between bowed transition areas between the inverted U-shaped middle portion and the free side legs, and the base flange of the bulb when the bulb is mounted in the reflector by the apparatus.

12. An apparatus as in claim 11 wherein a cross piece connecting both legs of the inverted U-shaped middle portion is planar in shape.

13. An apparatus as in claim 12 wherein the planar shaped cross piece includes a plug protrusion extending in the direction of an axis about which the hinged free side leg of the W-shape rotates on the reflector.

* * * * *